United States Patent
Ishii et al.

(10) Patent No.: US 8,970,145 B2
(45) Date of Patent: Mar. 3, 2015

(54) SYNCHRONOUS MOTOR CONTROLLER, SYNCHRONOUS MOTOR CONTROL METHOD

(71) Applicants: Mori Seiki Co., Ltd., Nara (JP); Intelligent Manufacturing Systems International, San Francisco, CA (US)

(72) Inventors: Shinji Ishii, Nara (JP); Masakazu Soshi, Nara (JP); Kazuo Yamazaki, El Macero, CA (US)

(73) Assignee: DMG Mori Seiki Co., Ltd., Nara (JP)

( * ) Notice: Subject to any disclaimer, the term of this patent is extended or adjusted under 35 U.S.C. 154(b) by 130 days.

(21) Appl. No.: 13/845,981

(22) Filed: Mar. 18, 2013

(65) Prior Publication Data

US 2013/0249447 A1  Sep. 26, 2013

(30) Foreign Application Priority Data

Mar. 23, 2012 (JP) ................................ 2012-067145

(51) Int. Cl.
*H02P 6/00* (2006.01)

(52) U.S. Cl.
USPC ............... 318/400.01; 318/400.02; 318/609; 318/610; 319/632

(58) Field of Classification Search
USPC .......... 318/400.01, 400.02, 432, 560, 568.22, 318/609, 610; 319/632
See application file for complete search history.

(56) References Cited

U.S. PATENT DOCUMENTS

| | | | | |
|---|---|---|---|---|
| 3,599,063 A | * | 8/1971 | Nanai et al. | 388/821 |
| 4,099,111 A | * | 7/1978 | Inaba et al. | 388/806 |
| 4,453,116 A | * | 6/1984 | Bose | 318/727 |
| 4,667,776 A | * | 5/1987 | Nomura | 187/289 |
| 4,734,633 A | * | 3/1988 | Ono et al. | 318/723 |
| 5,066,899 A | * | 11/1991 | Nashiki | 318/807 |
| 5,428,285 A | * | 6/1995 | Koyama et al. | 318/799 |
| 5,469,215 A | * | 11/1995 | Nashiki | 318/432 |
| 5,600,221 A | * | 2/1997 | Tomatsuri et al. | 318/632 |
| 5,646,495 A | * | 7/1997 | Toyozawa et al. | 318/625 |
| 5,691,615 A | * | 11/1997 | Kato et al. | 318/609 |
| 5,886,491 A | * | 3/1999 | Yoshida et al. | 318/592 |
| 6,040,671 A | * | 3/2000 | Brito et al. | 318/603 |
| 6,184,645 B1 | * | 2/2001 | Brito et al. | 318/632 |
| 6,252,368 B1 | * | 6/2001 | Sugie | 318/568.22 |
| 6,283,252 B1 | * | 9/2001 | Lee | 187/291 |
| 2001/0002097 A1 | * | 5/2001 | Tsutsui | 318/560 |
| 2003/0085683 A1 | * | 5/2003 | Satake et al. | 318/727 |
| 2003/0121716 A1 | * | 7/2003 | Yamada et al. | 180/446 |
| 2006/0069481 A1 | * | 3/2006 | Kubota et al. | 701/41 |
| 2007/0029959 A1 | * | 2/2007 | Ta et al. | 318/432 |
| 2010/0004824 A1 | * | 1/2010 | Ikeda et al. | 701/42 |
| 2010/0308757 A1 | * | 12/2010 | Ide et al. | 318/400.02 |

FOREIGN PATENT DOCUMENTS

JP  2009-038871  2/2009

* cited by examiner

*Primary Examiner* — Paul Ip
(74) *Attorney, Agent, or Firm* — Miller, Matthias & Hull LLP

(57) ABSTRACT

A controller for a conventional synchronous motor is configured to produce desired output characteristics. The controller generates a drive current for based on a current command, has a motor correcting section and a gain adjusting section which output a compensated current command based on the current command according to a compensating transfer function for cancelling a first transfer function showing a first torque response characteristic of the synchronous motor and replacing it with a second transfer function showing a second torque response characteristic, and a current controller which generates a drive current corresponding to the compensated current command.

10 Claims, 8 Drawing Sheets

(a)

(b)

SYNCHRONOUS MOTOR CONTROLLER, SYNCHRONOUS MOTOR CONTROL METHOD

TECHNICAL FIELD

The present disclosure relates to a synchronous motor controller and a synchronous motor control method for controlling the driving of a synchronous motor which drives, for example, a spindle of a machine tool and uses a permanent magnet as a magnetic pole of a rotor.

BACKGROUND OF THE DISCLOSURE

Conventionally, two types of motors, induction motor and synchronous motor, have been used as an alternating current motor which is a power source for a machine tool or the like. An induction motor has a configuration in which an induced current occurs in a rotor due to a revolving magnetic field generated by a stator and thereby a rotational torque corresponding to slip is generated, while a synchronous motor has a configuration in which a rotor rotates following a surrounding revolving magnetic field generated by an applied alternating current.

The advantages of an induction motor include that it has a simple configuration, that it is not easily broken because of its rigidity, that the efficiency in a high speed rotation region can be improved by the field weakening control, and that it is inexpensive. On the other hand, the disadvantages of an induction motor include that, because of the mechanism thereof, the frequency response band cannot be set to be high as compared with a synchronous motor, that heat generation in the rotor is large for causing a secondary induced current to flow, and that the torque ripple is large.

In contrast, the advantages of a synchronous motor include that the frequency response band can be set to be high, that heat generation in the rotor is small because of no secondary induced current, that it has a high efficiency because of a large torque in a low speed region, and that it is easily made compact in size as compared with an induction motor. On the other hand, the disadvantages of a synchronous motor include that it is often expensive because of use of a magnet, and that iron loss in a high speed rotation region is large because of the magnetic force of the magnet.

In the field of machine tool, mainly, an induction motor is widely used as a driving power source, and the reasons therefor are that the above-mentioned advantages of the induction motor are preferred, and that emphasis is placed on the fact that the induction motor can withstand an impact because of the presence of the slip phenomenon in which a torque occurs late when external disturbance occurs.

However, even in the field of machine tool, depending on cutting conditions, a purpose of cutting, a vibration system model of device structure and conditions of workpiece to be machined, there is the case where a synchronous motor is more advantageous than an induction motor. For example, when emphasis is placed on improving the rigidity and the stability of the motor in accordance with a purpose of cutting or the like, it is advantageous to employ a synchronous motor instead of an induction motor because it is preferable that the frequency response band of the motor is high.

Thus, because an induction motor and a synchronous motor are different from each other in their properties and their advantages and disadvantages, it would be convenient if it is possible to switch between them flexibly in accordance with a situation and a purpose.

In the Patent Literature 1, an induction synchronous motor in which an IM rotor rotating as induction motor and a PM rotor rotating as synchronous motor are connected to each other by an output shaft is suggested. In this induction synchronous motor, a composite current is generated by superimposing a current for induction motor for rotating the IM rotor and a current for synchronous motor for rotating the PM rotor, and this composite current is caused to flow through a coil of a stator. With this induction synchronous motor, it is possible to operate a single alternating current motor both as induction motor and as synchronous motor, and therefore it is possible to obtain driving characteristics of both motors depending on circumstances and in accordance with a situation and a purpose without preparing a plurality of motors.

CITATION LIST

Patent Literature

[Patent Literature 1] Japanese Unexamined Patent Application Publication No. 2009-38871

SUMMARY OF THE DISCLOSURE

Technical Problem

However, in the induction synchronous motor of the Patent Literature 1, it is necessary to prepare a rotor configuration for each of the IM rotor and the PM rotor and a hardware configuration for generating the composite current. Further, because the induction synchronous motor has the plurality of rotors connected by the output shaft, the motor configuration thereof cannot avoid becoming larger in weight and size. Therefore, increase of costs and increase of the size of the motor are problems in achieving the configuration of the induction synchronous motor.

Further, because, when the motor is larger in size, the device or apparatus on which the motor is mounted also requires a design different from a conventional one, and therefore there is a lack of design versatility and there are problems of increase of the size of the device or apparatus and increase of manufacturing costs.

In view of the above-described circumstances, a synchronous motor controller and a synchronous motor control method are provided which are capable of obtaining desired output characteristics (for example, output characteristics similar to those of an induction motor) while using a conventional synchronous motor as it is without changing hardware thereof.

Solution to Problem

The present disclosure relates to a synchronous motor controller which generates, on the basis of a current command, a drive current for a synchronous motor using a permanent magnet as a magnetic pole of a rotor.

The synchronous motor controller may have a current command compensating section which outputs a compensated current command based on the current command according to a compensating transfer function for cancelling a first transfer function showing a torque response characteristic A of the synchronous motor and replacing it with a second transfer function showing a torque response characteristic B other than that of the synchronous motor, and a drive current generating section which generates a drive current corresponding to the compensated current command generated by the current command compensating section and outputs the generated drive current to the synchronous motor.

In the above-described configuration, the synchronous motor controller generates, on the basis of a current command, a drive current for the synchronous motor using a permanent magnet as a magnetic pole of a rotor. The synchronous motor is, in control engineering, described by the first transfer function showing the torque response characteristic A in accordance with the configuration thereof. In other words, the first transfer function represents an input-output relationship of the synchronous motor.

The current command compensating section compensates the current command according to the compensating transfer function for cancelling the first transfer function and replacing it with the second transfer function, that is to say, the compensating transfer function for compensating the first transfer function, and thereby newly generates a compensated current command, and outputs the compensated current command to the drive current generating section.

It is also preferable that the torque response characteristic B is a torque response characteristic of an induction motor using a coil as a magnetic pole of a rotor. In this case, the induction motor is, in control engineering, described by the second transfer function showing the torque response characteristic B in accordance with the configuration thereof. In other words, the second transfer function represents an input-output relationship of the induction motor. The current command compensating section as described above may be achieved as a function block in form of hardware or may be achieved in form of software. Further, the torque response characteristic B may be an intermediate torque response characteristic between the torque response characteristic of the synchronous motor and the torque response characteristic of the induction motor.

According to the above-described configuration, when comparing the compensated current command with the original current command, the torque response characteristic A of the synchronous motor has been cancelled and the compensated current command has command contents which have been compensated to show the torque response characteristic B, and therefore, when a drive current generated on the basis of this compensated current command is output to the synchronous motor, the synchronous motor shows the torque response characteristic B in response to the original current command.

Therefore, while using a conventional synchronous motor as it is without changing hardware thereof, output characteristics different from the inherent output characteristics of the synchronous motor can be obtained. For example, the torque response characteristic of the synchronous motor can be made equivalent to that of an induction motor or set to be an intermediate torque response characteristic between the torque response characteristic of the synchronous motor and the torque response characteristic of the induction motor. Thereby, it is possible to achieve a desired torque response characteristic while utilizing advantages of synchronous motor.

Further, it is preferable that the current command compensating section determines the compensating transfer function and holds parameters representing motor characteristic values of the synchronous motor and the induction motor and the synchronous motor controller has a parameter setting section for modifying the parameters held by the current command compensating section according to a user input instruction.

According to the above-described configuration, the current command compensating section holds the parameters representing motor characteristic values (for example, resistance, inductance, torque constant, current control gain and the like) of the synchronous motor and the induction motor, which are determined by their respective capacities, voltages, external shapes, numbers of coil winding etc., and the details of the compensating transfer function are determined on the basis of these parameters. The parameter setting section modifies the parameters held by the current command compensating section according to a user input instruction.

Therefore, user's input of motor characteristic values of the actually used synchronous motor and motor characteristic values of an induction motor having desired output characteristics through an appropriate user interface allows the parameter setting section to accurately set the parameters held by the current command compensating section.

It is noted that the user's input of instruction is not limited to input of numerical values for all of the parameters, and may be selection of a desired set of numerical values from a predetermined selection menu, or input of parameters changing with time instead of fixed numerical values. Further, the parameter setting section may use the numerical values input by the user for the parameter setting in the current command compensating section as they are, or may perform various calculations (for example, interpolation) to the input numerical values before using them for the parameter setting.

Thereby, it is possible to show output of an induction motor having desired characteristics while using a synchronous motor.

Further, depending on the values of the parameters set by the parameter setting section, it is possible to obtain a motor output with intermediate characteristics between the characteristics of the synchronous motor and the characteristics of the induction motor or it is possible to continuously or discontinuously switch between the output characteristics of the synchronous motor and the output characteristics of the induction motor during operation of the motor. Thereby, it is possible to obtain a desired torque response characteristic flexibly in accordance with circumstances, a situation and a purpose.

Furthermore, it is preferable that the current command compensating section has, for outputting the compensated current command according to the compensating transfer function, a gain adjusting section which adjusts the gain of the current command on the basis of the first and second transfer functions and outputs the adjusted gain as the compensated current command. According to this configuration, such a compensating transfer function which adjusts the gain of the current command and cancels the first transfer function including the gain and replaces it with the second transfer function is achieved, thereby making it possible to output an accurate compensated current command.

Further, a synchronous motor control method is provided in which a drive current for a synchronous motor using a permanent magnet as a magnetic pole of a rotor is generated on the basis of a current command.

The synchronous motor control method may include a current command compensating step in which a compensated current command is output on the basis of the current command according to a compensating transfer function for cancelling a first transfer function showing a torque response characteristic A of the synchronous motor and replacing it with a second transfer function showing a torque response characteristic B other than that of the synchronous motor, and a drive current generating step in which a drive current is generated corresponding to the compensated current command and the generated drive current is output to the synchronous motor.

In the current command compensating step, the current command is compensated according to the compensating transfer function for cancelling the first transfer function and replacing it with the second transfer function, that is to say, the compensating transfer function for compensating the first transfer function, and a new compensated current command is output. In the drive current generating step, a drive current is generated corresponding to the compensated current command and the generated drive current is output to the synchronous motor.

According to the above-described configuration, when comparing the compensated current command with the original current command, the torque response characteristic A of the synchronous motor has been cancelled and the compensated current command has command contents which have been compensated to show the torque response characteristic B other than that of the synchronous motor, and therefore, when a drive current generated on the basis of this compensated current command is output to the synchronous motor, the synchronous motor shows the torque response characteristic B in response to the original current command.

It is also preferable that the torque response characteristic B is a torque response characteristic of an induction motor using a coil as a magnetic pole of a rotor. In this case, the induction motor is, in control engineering, described by the second transfer function showing the torque response characteristic B in accordance with the configuration thereof. In other words, the second transfer function represents an input-output relationship of the induction motor. Further, the torque response characteristic B may be an intermediate torque response characteristic between the torque response characteristic of the synchronous motor and the torque response characteristic of the induction motor.

Therefore, while using a conventional synchronous motor as it is without changing hardware thereof, output characteristics different from those of the synchronous motor can be obtained. For example, the torque response characteristic of the synchronous motor can be made equivalent to that of an induction motor and can be set to be an intermediate torque response characteristic between the torque response characteristic of the synchronous motor and the torque response characteristic of the induction motor. Thereby, it is possible to achieve a desired torque response characteristic while utilizing advantages of synchronous motor.

Advantageous Effects

The systems and methods disclosed herein may provide output characteristics (for example, output characteristics similar to those of an induction motor) while using a conventional synchronous motor as it is without changing hardware thereof.

DETAILED DESCRIPTION

Figure 1:
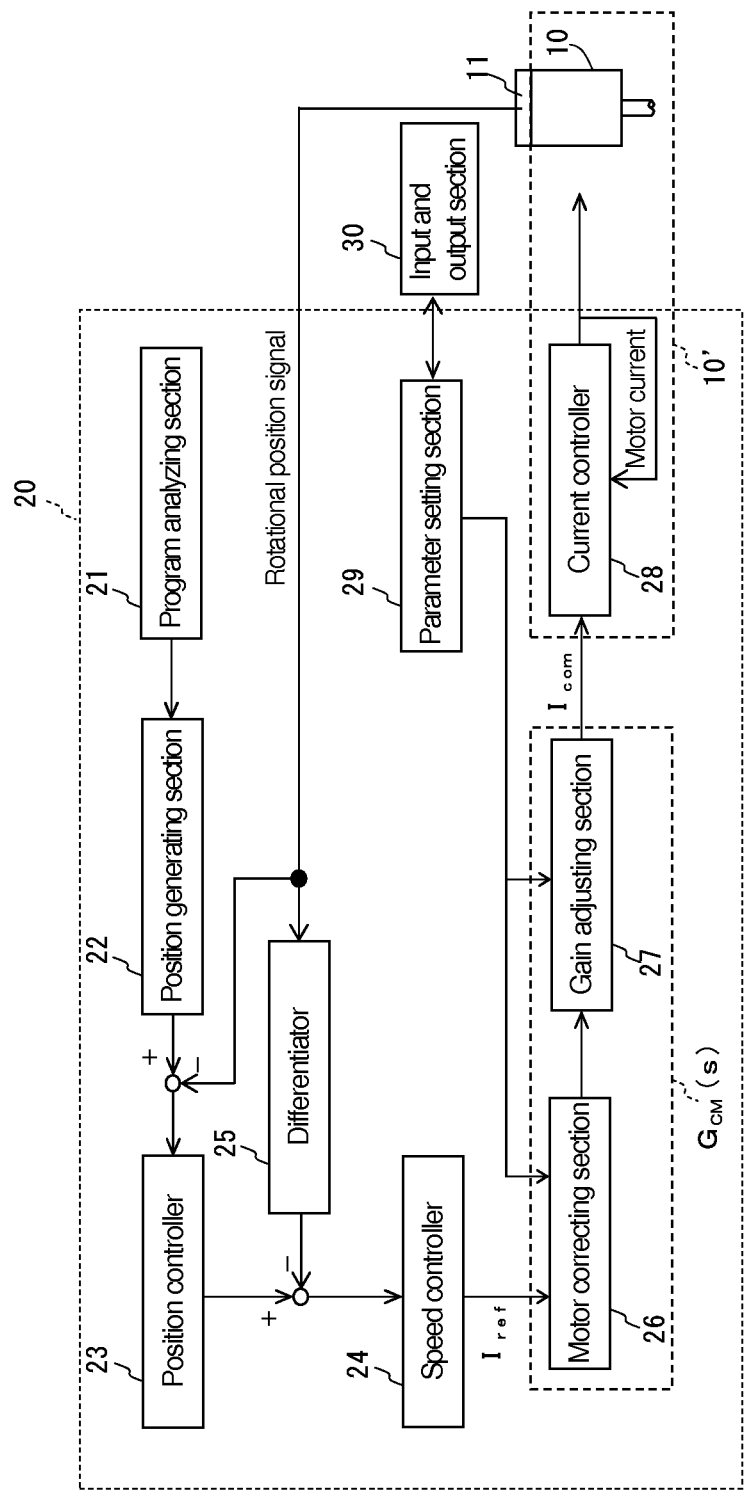
FIG. 1 is a block diagram showing configurations of a synchronous motor and a controller for the synchronous motor.

Embodiments of the present disclosure are described an shown in the drawings as applied to a synchronous motor for driving a spindle of a machine tool.

Figure 2:
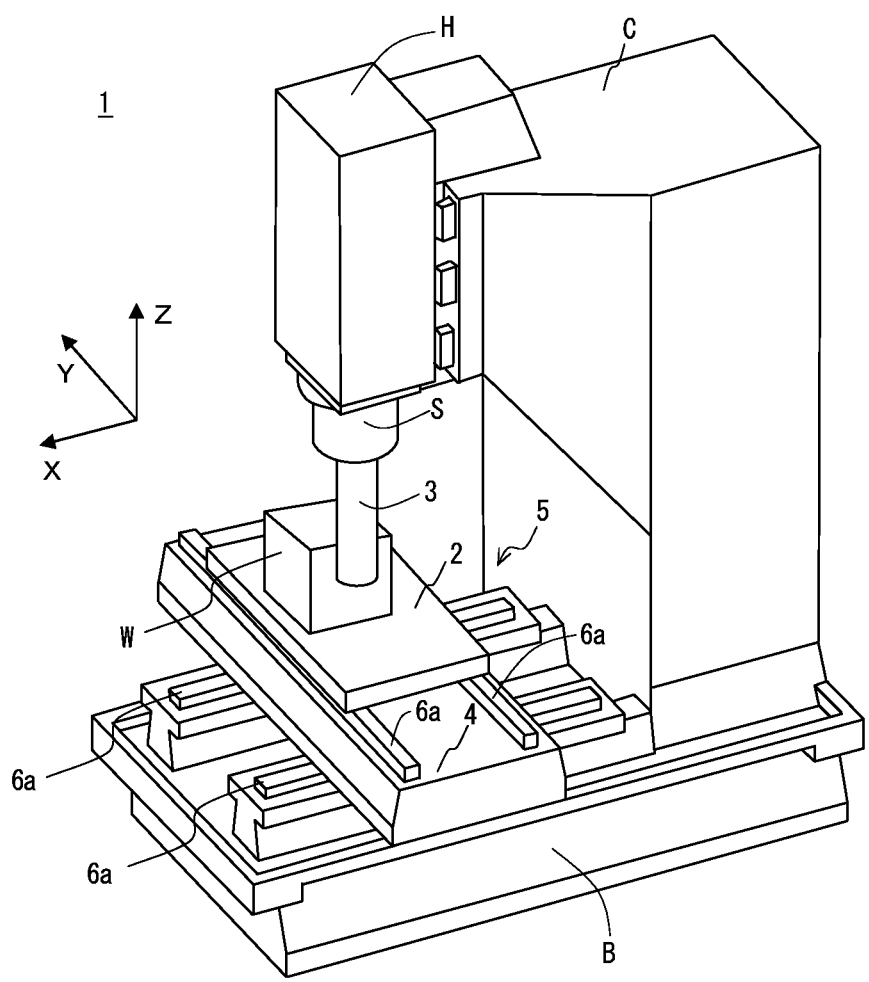
FIG. 2 is a schematic drawing showing the appearance of a machine tool.

FIG. 2 is a schematic drawing showing the appearance of a machine tool 1 to which the present disclosure is applied. As shown in FIG. 2, the machine tool 1 has a table 2 for fixedly holding a workpiece W by means of a clamp (not shown), a spindle S to which a tool 3 is attached, a saddle 4 supporting the table 2, and a feed device 5 for feeding the table 2 and the saddle 4 in the Y-axis direction and the X-axis direction shown in the figure, respectively.

The spindle S is mounted to a spindle head H which is moved in the Z-axis direction shown in the figure with respect to a column C, and is freely slidable in the Z-axis direction. The machine tool 1 controls operations of the feed device 5, the spindle head H and the spindle S according to a predetermined machining data and thereby machines the workpiece W into a three-dimensional target shape by the tool 3.

The machine tool 1 has a plurality of motors and achieves the movement of the feed device 5 and the spindle head H by a publicly known motor driving technique. Hereinafter, the configurations of a synchronous motor 10 for driving and rotating the spindle S and a controller 20 for controlling the driving of the synchronous motor 10 will be described with reference to FIG. 1.

The synchronous motor 10 is a synchronous motor using a permanent magnet as a magnetic pole of a rotor (Permanent Magnet Synchronous Motor, PMSM), and is connected to a position detector 11 comprising a rotary encoder. The position detector 11 measures a rotational position of the synchronous motor 10 and outputs a rotational position signal relating to the measured rotational position to the controller 20.

As shown in FIG. 1, the controller 20 comprises functional blocks, which are a program analyzing section 21, a position generating section 22, a position controller 23, a speed controller 24, a differentiator 25, a motor correcting section 26, a gain adjusting section 27, a current controller 28 and a parameter setting section 29.

The program analyzing section 21 analyzes a previously generated machining program (for example, an NC program), extracts commands relating to a rotational speed and a rotational position of the spindle S, and transmits the extracted commands to the position generating section 22. The position generating section 22 generates an operation command signal relating to a target rotational position of the spindle S taking a predetermined time constant into consideration on the basis of the signals received from the program analyzing section 21, and successively transmits the difference between the generated operation command signal and the rotational position signal received from the position detector 11 to the position controller 23. The position controller 23 generates a speed command signal on the basis of the signal received from the position generating section 22, and transmits the generated speed command signal to the speed controller 24.

The differentiator 25 generates a rotational speed signal by differentiating the rotational position signal received from the position detector 11, and negatively feeds back the generated rotational speed signal to output of the position controller 23. Thus, a rotational position error of the synchronous motor 10 is compensated by the rotational position signal output from the position detector 11.

The speed controller 24 generates a current command on the basis of the speed command signal received from the position controller 23, and transmits the generated current command to the motor correcting section 26. The motor correcting section 26 and the gain adjusting section 27 are functional blocks which output a compensated current command based on the current command received from the speed controller 24 according to a compensating transfer function for cancelling a first transfer function showing a torque response characteristic A of the synchronous motor 10 and replacing it with a second transfer function showing a torque response characteristic B of an induction motor. In the generation of the compensated current command, the gain adjusting section 27 performs a gain adjusting process. The details of the current-command compensating operation by the motor correcting section 26 and the gain adjusting section 27 will be described later.

The gain adjusting section 27 outputs the compensated current command to the current controller 28. The current controller 28 is configured to generate an actual drive current on the basis of the compensated current command received from the gain adjusting section 27 and output the actual drive current to the synchronous motor 10. The current controller 28 performs vector control for a d-axis current and a q-axis current independently.

By the above-described configuration, the controller 20 controls the rotational operation of the synchronous motor 10 for driving the spindle S according to the contents of the machining program.

Next, the details of the current-command compensating operation by the motor correcting section 26 and the gain adjusting section 27 are described. As described above, the motor correcting section 26 and the gain adjusting section 27 are configured to compensate the current command according to the compensating transfer function. As a premise for explaining the compensating transfer function, hereinafter, an input-output transfer function GIM(s) of an induction motor and an input-output transfer function GSM(s) of a synchronous motor are explained with reference to FIGS. 3 to 6.

Figure 3:
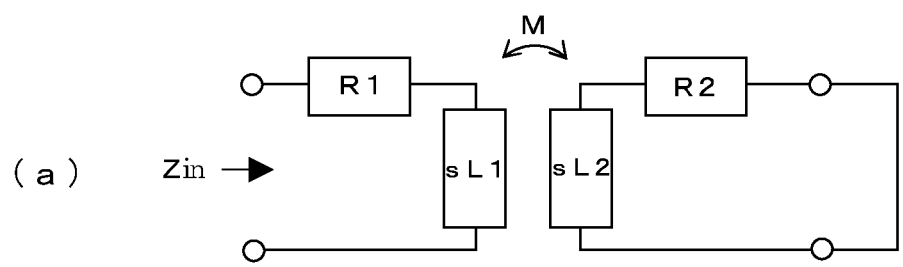
FIG. 3(a) and FIG. 3(b) are illustrations of an equivalent electrical circuit of an induction motor.
Figure 3:
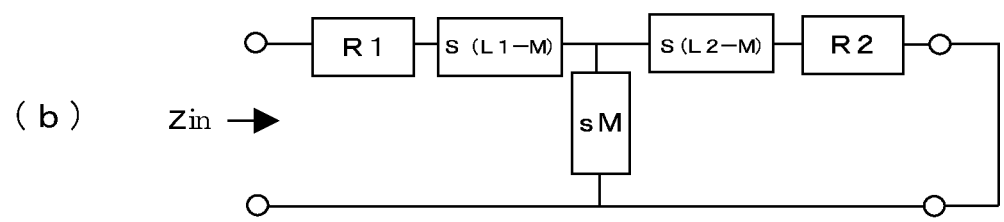

FIG. 3 shows illustrations of an equivalent electrical circuit of an induction motor. In FIG. 3(a), the resistance and the inductance of a coil of a stator are R1 and L1, respectively, the resistance and the inductance of a coil of a rotor are R2 and L2, respectively, and the mutual inductance between the coils of the stator and the rotor is M. When the mutual inductance M of FIG. 3(a) is introduced into the equivalent electrical circuit, the form of the equivalent electrical circuit is as shown in FIG. 3(b) and the circuit equation thereof is as shown in the following Equation (1).

$$Zin=(R2+sL2)/[R1R2+s(R1L2+R2L1)+s2(L1L2-M2)] \quad (1)$$

Figure 4:
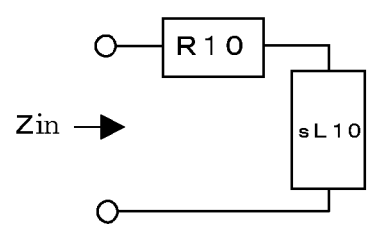
FIG. 4 is an illustration of an equivalent electrical circuit of a synchronous motor.
Figure 5:
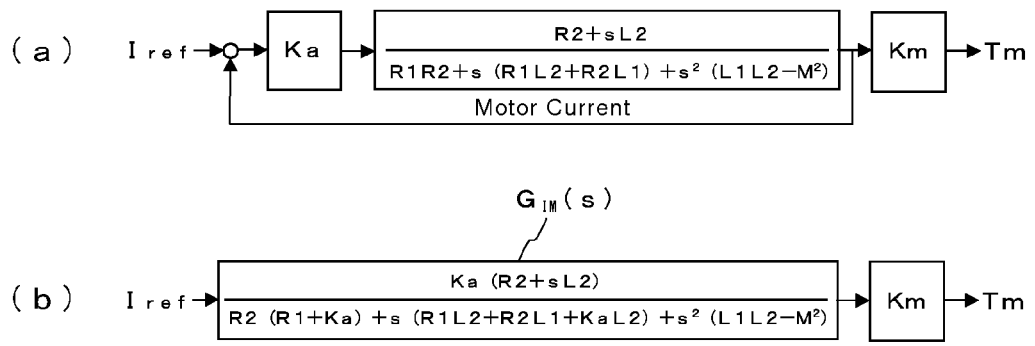
FIG. 5(a) and FIG. 5(b) are illustrations of an input-output transfer function of the induction motor.
Figure 6:
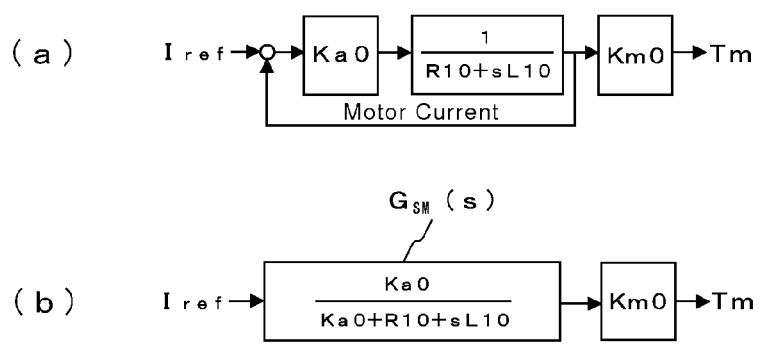
FIG. 6(a) and FIG. 6(b) are illustrations of an input-output transfer function of the synchronous motor.

On the other hand, FIG. 4 shows illustrations of an equivalent electrical circuit of a synchronous motor. Since a rotor of the synchronous motor is a permanent magnet, the equivalent electrical circuit thereof is as shown in FIG. 4 wherein the resistance and the inductance of a coil of a stator are R10 and L10, respectively, and the circuit equation thereof is as shown in the following Equation (2).

$$Zin=1/(R10+sL10) \quad (2)$$

According to the Equation (1), taking the equivalent-current control transfer function of the induction motor into consideration, the output torque Tm in response to an input current command Iref is represented as shown in FIG. 5(a) wherein the current control gain is Ka and the motor constant is Km. Feedback control using the actual current is used in FIG. 5(a), and therefore, when this feedback control is introduced, the input-output transfer function GIM(s) of the induction motor is described as shown in FIG. 5(b).

On the other hand, according to the Equation (2), taking the equivalent-current control transfer function of the synchronous motor into consideration, the output torque Tm in response to an input current command Iref is represented as shown in FIG. 6(a) wherein the current control gain is Ka0 and the motor constant is Km0. Feedback control using the actual current is used in FIG. 6(a), and therefore, when this feedback control is introduced, the input-output transfer function GSM(s) of the synchronous motor is described as shown in FIG. 6(b).

As described above, the motor correcting section 26 and the gain adjusting section 27 of the controller 20 (see FIG. 1) output the compensated current command based on the current command received from the speed controller 24 according to the compensating transfer function for cancelling the first transfer function showing the torque response characteristic A of the synchronous motor 10 (corresponding to the above-described input-output transfer function GSM(s)) and replacing it with the second transfer function showing the torque response characteristic B of the induction motor (corresponding to the above-described input-output transfer function GIM(s)).

Figure 7:
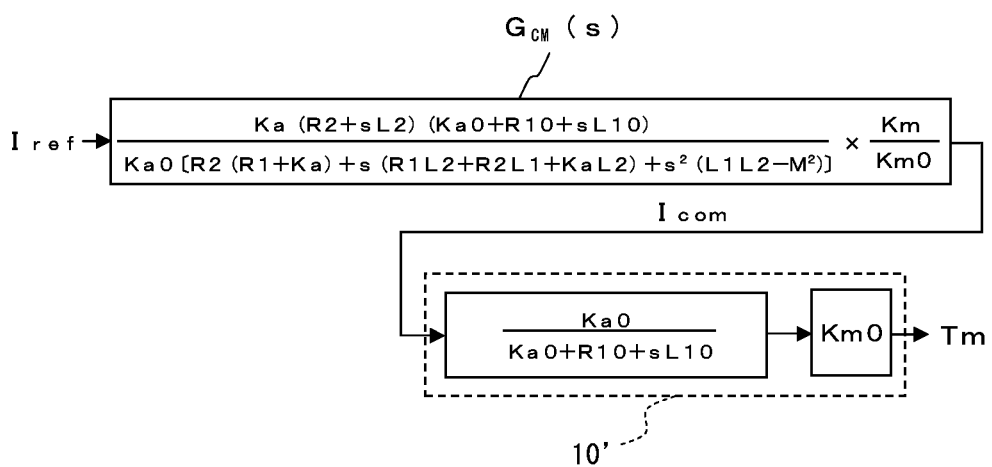
FIG. 7 is an illustration of an input-output transfer function of a controller (control method) according to the present disclosure.

Specifically, as shown in FIG. 7, the motor correcting section 26 and the gain adjusting section 27 apply a compensating transfer function GCM(s) to a current command Iref received from the speed controller 24 to generate a compensated current command Icom before input to the current controller 28 and the synchronous motor 10 which are surrounded by the dashed line 10' (see FIG. 1), and output this compensated current command Icom, to thereby reproduce input and output equivalent to the input-output transfer function GIM(s) shown in FIG. 5(b). In the compensating transfer function GCM(s), the adjustment of the motor constant (Km/Km0) corresponds to the gain adjustment and therefore is performed by the gain adjusting section 27. These functions of the motor correcting section 26 and the gain adjusting section 27 may be achieved by signal processing in form of software or by a circuit configuration in form of hardware.

In the Equation (3) below, the compensating transfer function GCM(s) is represented in a general form.

$$GCM(s)=GIM(s)/GSM(s)\times(Km/Km0) \quad (3)$$

The significances of the coefficients (Ka, Ka0, R1, R2, L1, L2, R10, L10, M, Km, Km0) of the compensating transfer function GCM(s) shown in FIG. 7 are as described above. In the controller 20, the motor correcting section 26 and the gain adjusting section 27 determine the compensating transfer function GCM(s) and hold, in a memory, a table or the like, values of the above-mentioned coefficients as parameters representing motor characteristic values (for example, resistance, inductance, torque constant, current control gain) of the synchronous motor and the induction motor, which are determined by their respective capacities, voltages, external shapes, numbers of coil winding, etc.

The controller 20 has the parameter setting section 29 for modifying the parameters held by the motor correcting section 26 and the gain adjusting section 27. As shown in FIG. 1, the parameter setting section 29 is connected to an input and output section 30 disposed outside the controller 20. The input and output section 30 has a display, a keyboard, a mouse and other components and is a user interface for showing information for the user and receiving user input instructions.

The controller 20 has the parameter setting section 29 for modifying the parameters held by the motor correcting section 26 and the gain adjusting section 27. As shown in FIG. 1, the parameter setting section 29 is connected to an input and output section 30 disposed outside the controller 20. The input and output section 30 has a display, a keyboard, a mouse and other components and is a user interface for showing information for the user and receiving user input instructions.

Figure 8:
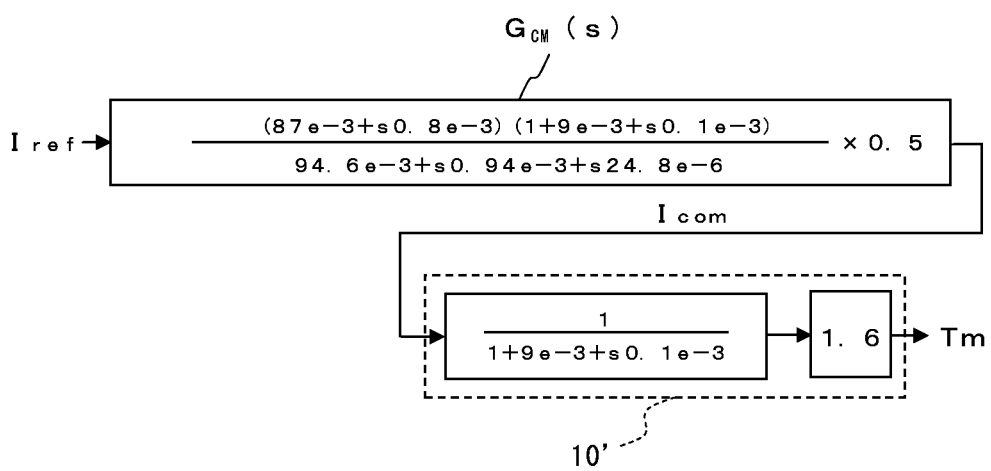
FIG. 8 is an illustration showing an example of the setting of a compensating transfer function.

As a specific example, FIG. 8 shows the compensating transfer function GCM(s) for the case where the parameter setting section 29 sets, according to a user input instruction, the parameters (the coefficients of the compensating transfer function GCM(s)) as follows: R1=87 mΩ, L1=0.8 mH, R2=87 mΩ, L2=0.8 mH, R10=9 mΩ, L10=0.1 mH, M=0.4 mH, Km=0.8, Km0=1.6, Ka=1, and Ka0=1. In FIG. 8, for example, e-3 means 10-3. Setting such a compensating transfer function GCM(s) makes it possible to make the output characteristics of the synchronous motor equivalent to target output characteristics of induction motor.

Further, depending on the contents of the set parameters, it is also possible to obtain a motor output with intermediate characteristics between the characteristics of the synchronous motor and the characteristics of the induction motor, and to continuously or discontinuously switch between the output characteristics of the synchronous motor and the output characteristics of the induction motor during operation of the motor.

Figure 9:
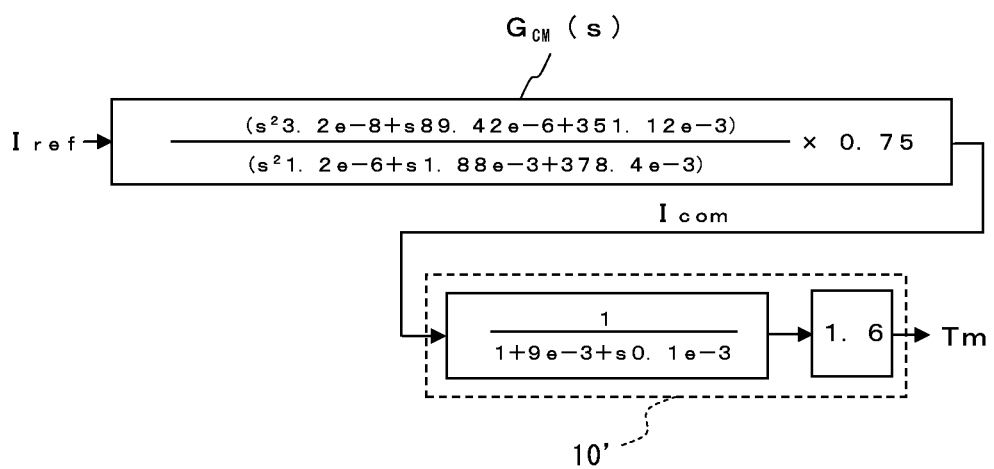
FIG. 9 is an illustration showing an example of the setting of the compensating transfer function.

On the premise that the same synchronous motor as shown in FIG. 8 is used, FIG. 9 shows examples of the coefficients of the compensating transfer function GCM(s) which are set for obtaining a motor output with intermediate characteristics between the characteristics of the synchronous motor and the characteristics of the induction motor.

Figure 10:
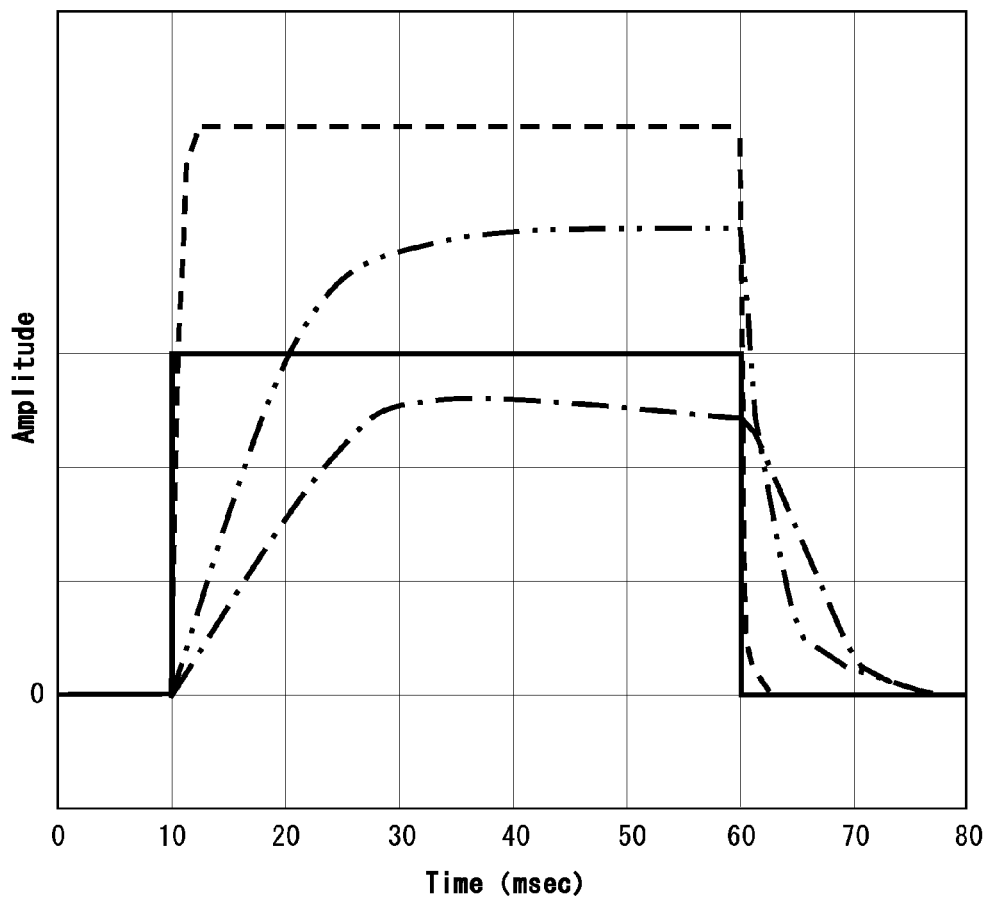
FIG. 10 is a graph showing calculation results from computer simulation.

Finally, the effectiveness of the present disclosure is verified using results of computer simulation. FIG. 10 is a graph showing results of simulation for calculating change of the torque responses of a synchronous motor and an induction motor in response to a square-wave current command. The same motor characteristic values (resistance, inductance, torque constant, current control gain) as those for the parameter setting shown in FIG. 8 are used for the simulation calculation.

In FIG. 10, the bold solid line, the dashed line and the one-dot chain line indicate a current command, the torque response of the synchronous motor and the torque response of the induction motor, respectively. As shown in FIG. 10, the torque response characteristics of the synchronous motor and the induction motor are different from each other. When simulating the torque response of the synchronous motor to which the compensating operation was applied according to the transfer function shown in FIG. 8, the torque response at that time was completely coincident with the torque response of the induction motor indicted by the one-dot chain line. It is noted that, when simulating the speed response separately from the torque response, including the case where external disturbance was present, the speed response of the synchronous motor to which the compensating operation was applied was completely coincident with the speed response of the induction motor.

According to the above simulation results, it was confirmed that, when a synchronous motor is controlled according to the present embodiment, the synchronous motor can show output characteristics equivalent to those of an induction motor in response to an original current command. Therefore, according to the present embodiment, it is possible to achieve output characteristics equivalent to those of an induction motor while using a conventional synchronous motor as it is. Further, it is possible to, on one synchronous motor, change output characteristics thereof flexibly depending on circumstances, a situation and a purpose, thereby easily obtaining output characteristics equivalent to those of an induction motor and returning the output characteristics to those of the synchronous motor.

Furthermore, in FIG. 10, the torque response of a motor (motor with intermediate characteristics) having intermediate output characteristics between the characteristics of the synchronous motor and the induction motor shown in FIG. 9 is indicated by the two-dot chain line. Some conventional induction motors and synchronous motors cannot achieve such intermediate output characteristics between output characteristics of synchronous motor and out characteristic of induction motor, and such intermediate output characteristics are achieved by the compensating operation of the present embodiment and therefore are peculiar thereto. The achievement of such intermediate output characteristics makes it possible also to continuously change the motor output between the output characteristics of the synchronous motor and the output characteristics of the induction motor during operation of the motor.

Thus, one embodiment of the present disclosure has been described. However, a specific embodiment in which the present disclosure can be complemented is not limited thereto.

For example, although, in the above embodiment, the configuration in which the parameters are modified on the basis of a user input instruction thought the input and output section 30 is described, a configuration is possible in which the modification of the parameters is automatically performed by the synchronous motor controller on the basis of information included in the machining program or according to a previously provided algorithm instead of on the basis of a user input instruction.

Further, matters which are not limited in the above description can be optionally designed in the present disclosure. For example, the type of the induction motor described by the second transfer function may be a three-phase type in which a three-phase alternating power is used as input or a single-phase type in which a single-phase alternating power is used as input, and the determination thereof is optional.

INDUSTRIAL APPLICABILITY

The present disclosure is preferably applicable to a synchronous motor controller and a synchronous motor control method for controlling the driving of a synchronous motor which drives, for example, a spindle of a machine tool and uses a permanent magnet as a magnetic pole of a rotor.

What is claimed is:
1. A synchronous motor controller comprising at least a speed controller generating a current command and outputting the generated current command, and a current controller generating a drive current corresponding to the current command and outputting the generated drive current, and which supplies the drive current from the current controller to a synchronous motor using a permanent magnet as a magnetic pole of a rotor to drive the synchronous motor, in which:
    a torque response characteristic of the synchronous motor comprises a first torque response characteristic A defined by a first transfer function, the torque response characteristic representing a relationship between the current command output from the speed controller and an output torque of the synchronous motor driven by the drive current generated by the current controller corresponding to the current command output from the speed controller;

the synchronous motor controller further comprises a current command compensating section which compensates the current command output from the speed controller according to a compensating transfer function to generate a compensated current command causing the torque response characteristic representing the relationship between the current command output from the speed controller and the output torque of the synchronous motor to be a second torque response characteristic B that is a torque response characteristic other than the first torque response characteristic A and is defined by a second transfer function, and outputs the generated compensated current command to the current controller;

the compensating transfer function includes a function obtained by dividing the second transfer function by the first transfer function; and the current controller is configured to generate a drive current corresponding to the compensated current command output from the current command compensating section and output the generated drive current to the synchronous motor.

2. The synchronous motor controller of claim 1, in which the current command compensating section has, for outputting the compensated current command according to the compensating transfer function, a gain adjusting section which adjusts a gain of the current command on the basis of the first and second transfer functions and outputs the adjusted gain as the compensated current command.

3. The synchronous motor controller of claim 1, in which the second torque response characteristic B is equivalent to a torque response characteristic which an induction motor using a coil as a magnetic pole of a rotor shows.

4. The synchronous motor controller of claim 3, in which the current command compensating section has, for outputting the compensated current command according to the compensating transfer function, a gain adjusting section which adjusts a gain of the current command on the basis of the first and second transfer functions and outputs the adjusted gain as the compensated current command.

5. The synchronous motor controller of claim 3, in which:
the current command compensating section determines the compensating transfer function and holds parameters representing motor characteristic values of the synchronous motor and the induction motor; and
the synchronous motor controller has a parameter setting section for modifying the parameters held by the current command compensating section according to a user input instruction.

6. The synchronous motor controller of claim 5, in which the current command compensating section has, for outputting the compensated current command according to the compensating transfer function, a gain adjusting section which adjusts a gain of the current command on the basis of the first and second transfer functions and outputs the adjusted gain as the compensated current command.

7. The synchronous motor controller of claim 1, in which:
when the first transfer function, the second transfer function and the compensating transfer function are represented by $G_{SM}(s)$, $G_{IM}(s)$ and $G_{CM}(s)$, respectively, $G_{SM}(s)$, $G_{IM}(s)$ and $G_{CM}(s)$ are represented by equations:

$$G_{SM}(s)=Ka0/(Ka0+R10+s*L10);$$

$$G_{IM}(s)=[Ka*(R2+s*L2)]/[R2*(R1+Ka)+s*(R1*L2+R2*L1+Ka*L2)+s^2*(L1*L2-M^2)];$$

and $$G_{CM}(s)=[G_{IM}(s)/G_{SM}(s)]*(Km/Km0);$$

where: R10 and L10 are a resistance and an inductance of a coil of a stator of the synchronous motor, respectively; Ka0 and Km0 are a current control gain and a motor constant set for the synchronous motor, respectively; R1 and L1 are a resistance and an inductance of a coil of a stator of an assumed induction motor, respectively; R2 and L2 are a resistance and an inductance of a coil of a rotor of the induction motor, respectively; M is a mutual inductance between the coils of the stator and the rotor; and Ka and Km are a current control gain and a motor constant set for the induction motor.

8. A synchronous motor control method comprising at least a current command generating step of generating a current command by a speed controller and outputting the generated current command, and a drive current generating step of generating a drive current corresponding to the current command by a current controller and supplying the generated drive current to a synchronous motor using a permanent magnet as a magnetic pole of a rotor in which:

a torque response characteristic of the synchronous motor comprises a first torque response characteristic A defined by a first transfer function, the torque response characteristic representing a relationship between the current command generated in the current command generating step and an output torque of the synchronous motor driven by the drive current generated in the drive current generating step corresponding to the current command output from the speed controller;

the control method further comprises a current command compensating step of compensating the current command generated in the current command generating step according to a compensating transfer function to generate a compensated current command causing the torque response characteristic representing the relationship between the current command generated in the current command generating step and the output torque of the synchronous motor to be a second torque response characteristic B that is a torque response characteristic other than the first torque response characteristic A and is defined by a second transfer function, and outputting the generated compensated current command to the current controller;

the compensating transfer function includes a function obtained by dividing the second transfer function by the first transfer function; and the drive current generating step is configured to generate a drive current corresponding to the compensated current command generated in the current command compensating step and output the generated drive current to the synchronous motor.

9. The synchronous motor control method of claim 8, in which the second torque response characteristic B is equivalent to a torque response characteristic which an induction motor using a coil as a magnetic pole of a rotor shows.

10. The synchronous motor control method of claim 8, in which:

when the first transfer function, the second transfer function and the compensating transfer function are represented by $G_{SM}(s)$, $G_{IM}(s)$ and $G_{CM}(s)$, respectively, $G_{SM}(s)$, $G_{IM}(s)$ and $G_{CM}(s)$ are represented by equations:

$$G_{SM}(s) = Ka0/(Ka0 + R10 + s*L10);$$

$$G_{IM}(s) = [Ka*(R2 + s*L2)]/[R2*(R1 + Ka) + s*(R1*L2 + R2*L1 + Ka*L2) + s^2*(L1*L2 - M^2)];$$

and $$G_{CM}(s) = [G_{IM}(s)/G_{SM}(s)]*(Km/Km0);$$

where: R10 and L10 are a resistance and an inductance of a coil of a stator of the synchronous motor, respectively; Ka0 and Km0 are a current control gain and a motor constant set for the synchronous motor, respectively; R1 and L1 are a resistance and an inductance of a coil of a stator of an assumed induction motor, respectively; R2 and L2 are a resistance and an inductance of a coil of a rotor of the induction motor, respectively; M is a mutual inductance between the coils of the stator and the rotor; and Ka and Km are a current control gain and a motor constant set for the induction motor.

* * * * *

UNITED STATES PATENT AND TRADEMARK OFFICE
CERTIFICATE OF CORRECTION

PATENT NO. : 8,970,145 B2
APPLICATION NO. : 13/845981
DATED : March 3, 2015
INVENTOR(S) : Shinji Ishii et al.

It is certified that error appears in the above-identified patent and that said Letters Patent is hereby corrected as shown below:

On the Title Page, Item (73) the Assignee should read:

DMG Mori Seiki Co., Ltd., Nara (JP)
INTELLIGENT MANUFACTURING SYSTEMS INTERNATIONAL,
SAN FRANCISCO (CA)

Signed and Sealed this
Ninth Day of August, 2016

Michelle K. Lee
*Director of the United States Patent and Trademark Office*